US009620036B1

(12) United States Patent
Hartman

(10) Patent No.: US 9,620,036 B1
(45) Date of Patent: Apr. 11, 2017

(54) SIGN HOLDER

(71) Applicant: Jeffrey K. Hartman, Bettendorf, IA (US)

(72) Inventor: Jeffrey K. Hartman, Bettendorf, IA (US)

( * ) Notice: Subject to any disclaimer, the term of this patent is extended or adjusted under 35 U.S.C. 154(b) by 0 days.

(21) Appl. No.: 14/993,033

(22) Filed: Jan. 11, 2016

Related U.S. Application Data

(63) Continuation of application No. 13/937,115, filed on Jul. 8, 2013, now Pat. No. 9,275,563, which is a continuation-in-part of application No. 12/365,504, filed on Feb. 4, 2009, now abandoned.

(60) Provisional application No. 61/817,456, filed on Apr. 30, 2013, provisional application No. 61/063,746, filed on Feb. 5, 2008.

(51) Int. Cl.
*G06F 15/00* (2006.01)
*G09F 7/18* (2006.01)

(52) U.S. Cl.
CPC ........ *G09F 7/18* (2013.01); *G09F 2007/1834* (2013.01); *G09F 2007/1856* (2013.01); *G09F 2007/1873* (2013.01)

(58) Field of Classification Search
CPC ............... G09F 7/18; G09F 15/00; G09F 7/00
USPC ............. 40/606.01, 607.03, 607.05; 248/156
See application file for complete search history.

(56) References Cited

U.S. PATENT DOCUMENTS

| | | | |
|---|---|---|---|
| 4,658,527 | A | 4/1987 | Pingel |
| 4,660,310 | A | 4/1987 | Farmer |
| 4,894,937 | A | 1/1990 | Davis |
| 4,910,902 | A | 3/1990 | Anderson |
| 4,913,389 | A | 4/1990 | Mccracken |
| 5,042,183 | A | 8/1991 | Kennedy |
| 5,207,402 | A | 5/1993 | Berry-Tremmel et al. |
| 5,307,580 | A | 5/1994 | Farmer |
| 5,595,010 | A | 1/1997 | Fuller et al. |
| 5,878,517 | A | 3/1999 | Gill |
| 6,370,803 | B1 | 4/2002 | Burquest |
| 6,547,204 | B1 | 4/2003 | Peck |
| 7,437,844 | B1 | 10/2008 | Kennedy |
| 7,681,348 | B1 | 3/2010 | Saylor |
| D642,220 | S | 7/2011 | Moshluk et al. |
| 2005/0039363 | A1 | 2/2005 | Galey |
| 2005/0076552 | A1 | 4/2005 | Tolna et al. |
| 2005/0077441 | A1 | 4/2005 | Coverstone et al. |
| 2006/0059750 | A1 | 3/2006 | Schwat |
| 2007/0062086 | A1 | 3/2007 | Hamel et al. |
| 2010/0031546 | A1 | 2/2010 | Nwatu |
| 2010/0058635 | A1 | 3/2010 | Knapp et al. |
| 2014/0075797 | A1 | 3/2014 | Urbina |

*Primary Examiner* — Shin Kim
(74) *Attorney, Agent, or Firm* — Hamilton IP Law, PC; Jay R. Hamilton; Charles A. Damschen

(57) ABSTRACT

A sign holder includes a pair of upright posts, each having a lower ground engaging end and an upwardly disposed portion having a serpentine area with a plurality of bend areas leading to an upper end which is not aligned with the lower end. A relatively thicker transverse member joins the upright posts such that the upper ends thereof are spaced farther apart than the lower ends thereof.

17 Claims, 6 Drawing Sheets

SIGN HOLDER

CROSS REFERENCE TO RELATED APPLICATIONS

Applicant states that this utility patent application is a continuation of and claims priority from U.S. patent application Ser. No. 13/937,115 filed on Jul. 8, 2013, which was a continuation-in-part of and claimed priority from U.S. patent application Ser. No. 12/365,504 filed on Feb. 4, 2009, which claimed priority under 35 U.S.C. 119(e) from provisional U.S. Pat. App. No. 61/063,746, filed Feb. 5, 2008. Applicant states U.S. patent application Ser. No. 13/937,115 filed on Jul. 8, 2013 also claimed priority under 35 U.S.C. 119(e) from provisional U.S. Pat. App. No. 61/817,456 filed on Apr. 30, 2013, all of which are incorporated by reference herein in their entireties.

FIELD OF THE INVENTION

The present invention relates to a sign holder. More specifically, the invention relates to wire frame sign holders, such as employed for yard signs.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable.

AUTHORIZATION PURSUANT TO 37 C.F.R. §1.171 (D)(C)

A portion of the disclosure of this patent document may contain material that is subject to copyright and trademark protection. The copyright owner has no objection to the facsimile reproduction by anyone of the patent document or the patent disclosure, as it appears in the Patent and Trademark Office patent file or records, but otherwise reserves all copyrights whatsoever.

DETAILED DESCRIPTION

DETAILED DESCRIPTION

Listing of Elements

| Element Description | Element Number |
|---|---|
| Sign holder | 10 |
| Ground | 11 |
| Sign | 12 |
| Upper Portion | 13 |
| Posts | 14 |
| Upper end | 15 |
| Upper post length | 16 |
| Upper portion of upper post length | 16a |
| Lower portion of upper post length | 16b |
| First end of upper post | 16c |
| Second end of upper post | 16d |
| Serpentine area | 17 |
| First bend (radius area) | 18 |
| Second bend (radius area) | 19 |
| Transition lengths | 20 |
| Lower length | 21 |
| Lower end | 22 |
| First Transverse member | 23 |
| Second Transverse member | 24 |
| Threaded male ends | 25 |
| Threaded couplings | 26 |
| Lower Portion | 27 |
| | 28 |
| Lobe | 29 |
| Connection | 30 |
| Upper connection | 30a |
| Lower connection | 30b |

DETAILED DESCRIPTION OF INVENTION

Before the various embodiments of the present invention are explained in detail, it is to be understood that the invention is not limited in its application to the details of construction and the arrangements of components set forth in the following description. The invention is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description of the present invention, and do not alone indicate or imply that the device or element referred to must have a particular orientation. In addition, terms such as "first", "second", and "third" are used herein and in the appended claims for purposes of description and are not intended to indicate or imply relative importance or significance.

The following detailed description is of the best currently contemplated modes of carrying out illustrative embodiments of the invention. The description is not to be taken in a limiting sense, but is made merely for the purpose of illustrating the general principles of the invention, since the scope of the invention is best defined by the appending claims. Various inventive features are described below herein that can each be used independently of one another or in combination with other features.

ILLUSTRATIVE EMBODIMENT AND ADVANTAGES OF INVENTION

A holder includes a pair of upright posts, each having a lower ground engaging end and an upwardly disposed portion having a serpentine area with at least first and second bend areas leading to an upper end which is not aligned with the lower end. A relatively thicker transverse member joins the upright posts such that the upper ends thereof are spaced farther apart than the lower ends thereof.

DETAILED DESCRIPTION OF THE INVENTION

Figure 1:
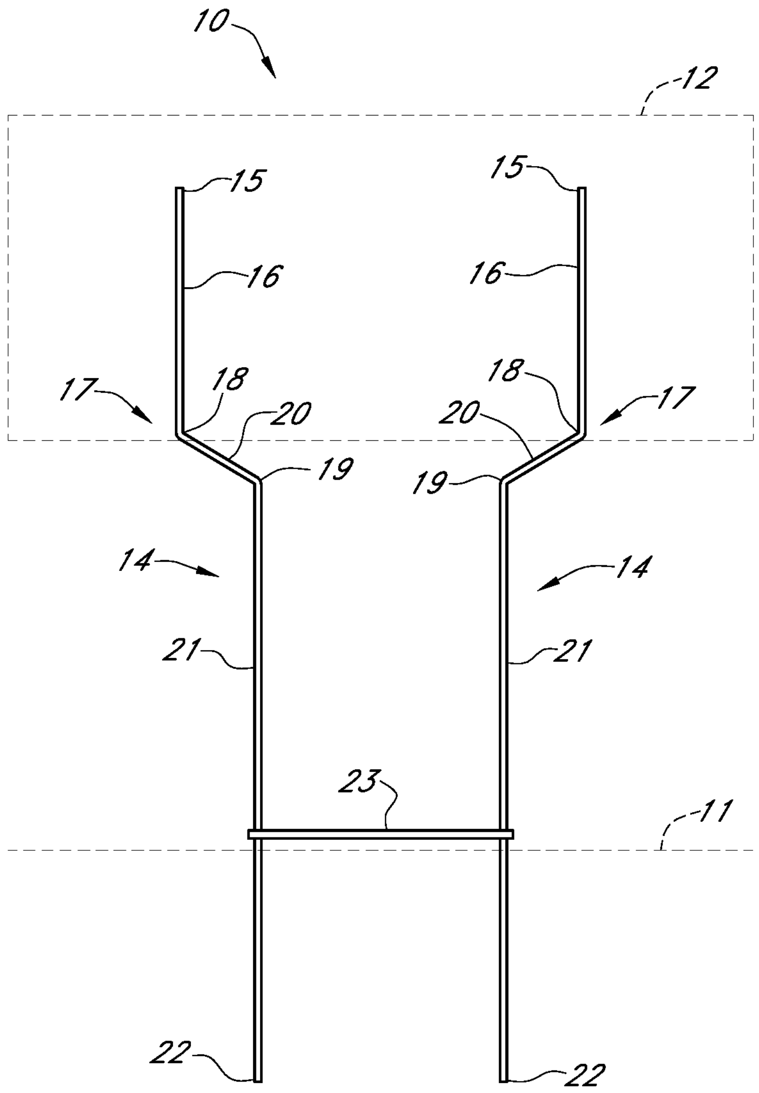
FIG. 1 is a front, elevational view of one embodiment of the sign holder described herein.

Referring now to the drawings, wherein like reference numerals designate identical or corresponding parts throughout the several views, FIG. 1 shows the sign holder of this invention generally at (10). The sign holder (10) engages the ground (11) and supports the sign (12) spaced apart from the ground (11).

Figure 1A:
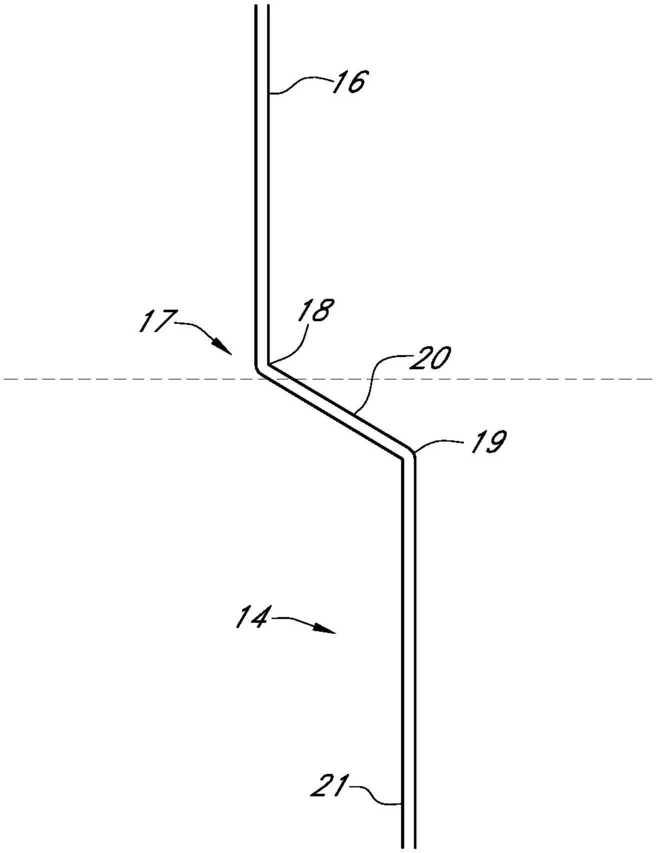
FIG. 1A is a detailed view of one embodiment of the serpentine area (17) defined by and between upper end (15) and lower length (21) of the embodiment of FIG. 1.

The sign holder (10) more specifically includes a pair of posts (14). Each post terminates at an upper end (15). An upper post length (16) extends from upper end to a serpentine area (17) including a first bend or radius area (18), a second bend or radius area (19), and a transition length (20) extending between said areas (18, 19). A lower length (21) extends from second radius area (19) to a lower end (22). Optionally, the serpentine area (17) may include additional bend or radius areas and transition lengths. As illustrated by FIG. 1A, serpentine area (17) defines a curving, or repeatedly curving shape, in alternate directions, between upper post length (16) and lower length (21) of the embodiment of FIG. 1 via first bend or radius area (18), transition length (20) and second bend or radius area (19).

A transverse member (23) connects the posts (14). More specifically, the transverse member (23) is disposed downwardly from second radius area (19), toward, and relatively closer to, the lower ends (22) and extends from the lower length (21) of one post (14) to the lower length (21) of the other post (14).

The posts (14) are joined such that the upper post lengths (16), transition lengths (20) and depending lengths (21) are co-planar. The transition lengths (20) extend away from each other such that the upper post lengths (16) are more widely separated than the depending lengths (21). See FIG. 1A for further illustration.

When used, the lower ends (22) of posts (14) are positioned to engage the ground such that the posts (14) are substantially perpendicular to the ground (11). The user then presses on transverse member (23) to drive the lower lengths (21) into the ground up to the level of the transverse member (23). The sign (12) is positioned against the upper ends (15) then pushed downwardly onto the upper post lengths (16). In the alternative, the sign (12) may be positioned on the sign holder (10) prior to insertion into the ground (11). Typically the sign (12) is of a corrugated plastic. The post lengths (16) fit into the openings typically formed by the corrugations.

Preferably, the posts (14) are formed from steel wire, preferably from stainless steel, but also from galvanized or bright basic steel. A suitably stiff plastic also may be used. A preferred dimension for the posts (14) is 0.162 inch wire throughout the length thereof, from upper end (15) to lower end (22). The transverse member (23) also preferably is formed from steel wire however, which is heavier. A preferable dimension is 0.188 inch diameter. The first portion of serpentine area (17) formed by post length (16) and transition length (20), at first radius area (18), preferably forms a 120 degree angle opening toward the interior space between the posts (14). The second portion of serpentine area (17), formed by the second radius area (19), formed by transition length (20) and lower length 21, preferably forms a similar 120 degree angle opening toward the exterior of the posts (14).

Preferably, the length from upper ends (15) to first radius area (18), the transition length (20), and the length from second radius area (19) to lower lengths (21) to transverse member (23), and the separation of the lower ends (22) are of similar dimension. In a preferred sign holder (10) the dimension from upper ends (15) to lower ends (22) is twenty-two inches (22"). The spacing between the upper ends (15) is 10 inches. The spacing between the lower lengths (21) is six inches (6"). The relatively heavy gauge employed for the posts (14), together with the bracing afforded by the even heavier gauge transverse member (23) facilitates relatively effortless driving of the sign holder (10) into the ground (11) even during winter conditions wherein the ground is frozen. Further provided is resistance to the inward bending of posts as occurs in common sign holders, thereby facilitating maintenance of the integrity of the sign (12). The adjacent radius areas (18, 19) are of particular importance for facilitating supporting the sign (12) against the wind.

Figure 2:
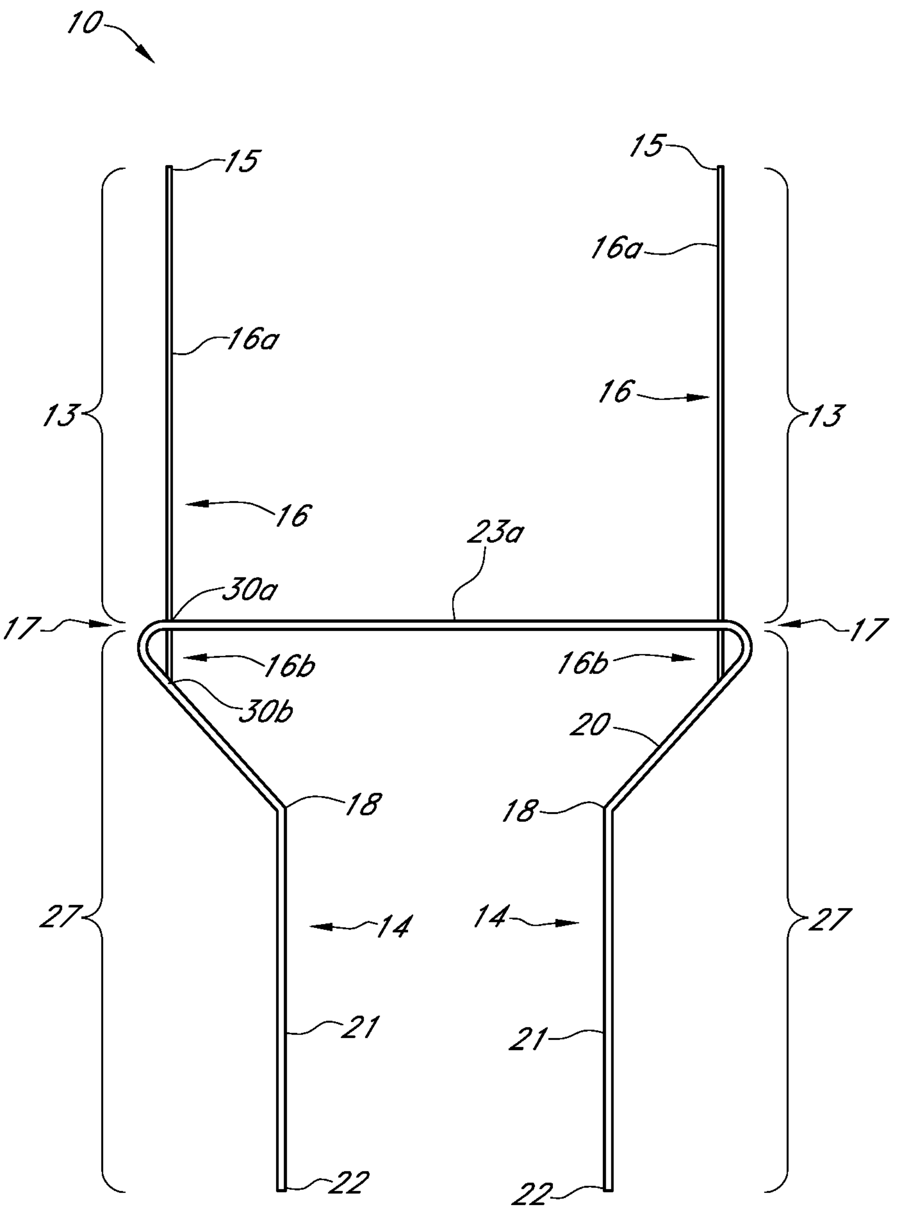
FIG. 2 is a front elevational view of a second embodiment of the sign holder described herein.
Figure 2A:
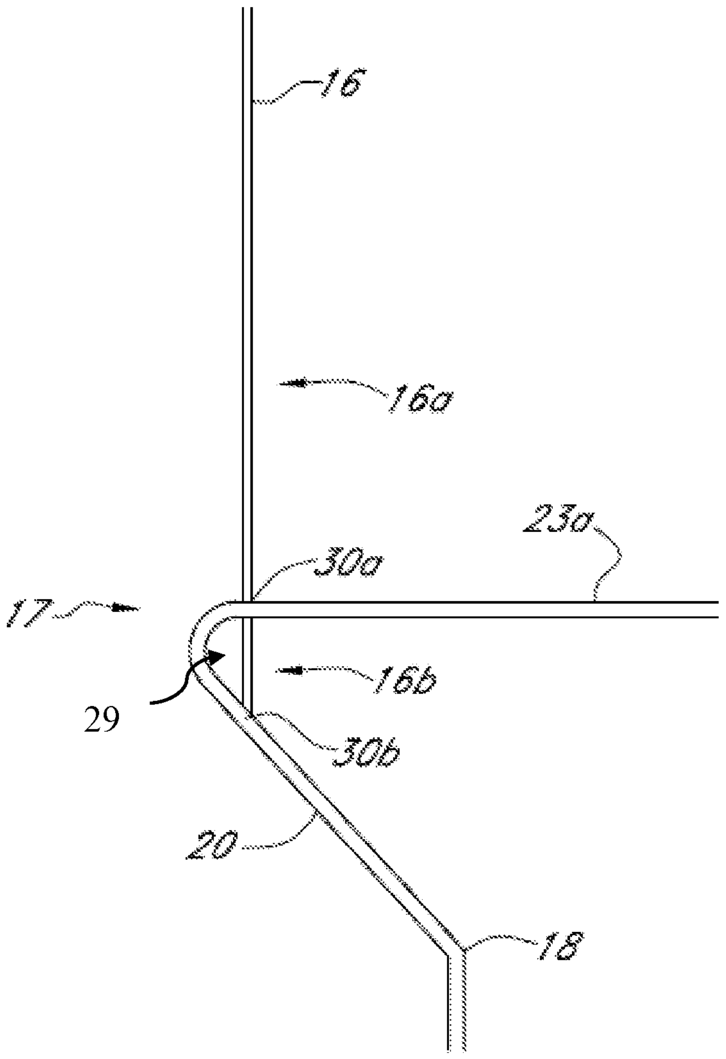
FIG. 2A is a detailed view of another embodiment of the serpentine area (17) defined by and between upper end (15) and lower length (21) of the embodiment of FIG. 2.
Figure 3A:
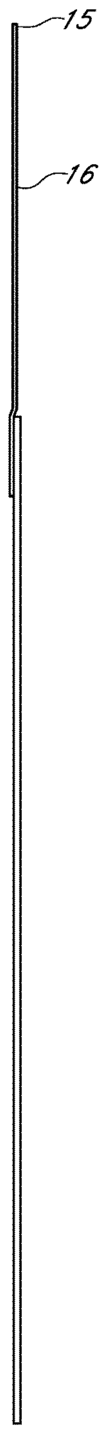
FIG. 3A is a side view of the sign holder of FIG. 3.
Figure 3:
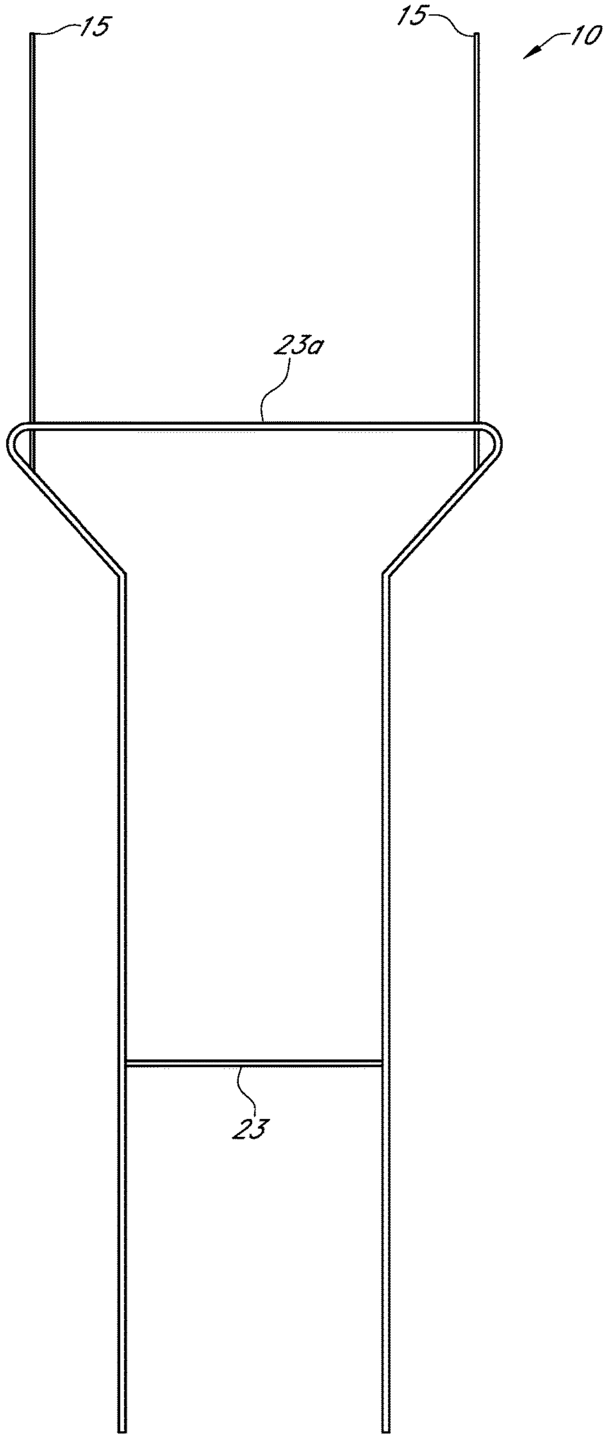
FIG. 3 is a front elevational view of a third embodiment of the sign holder described herein.
Figure 4:
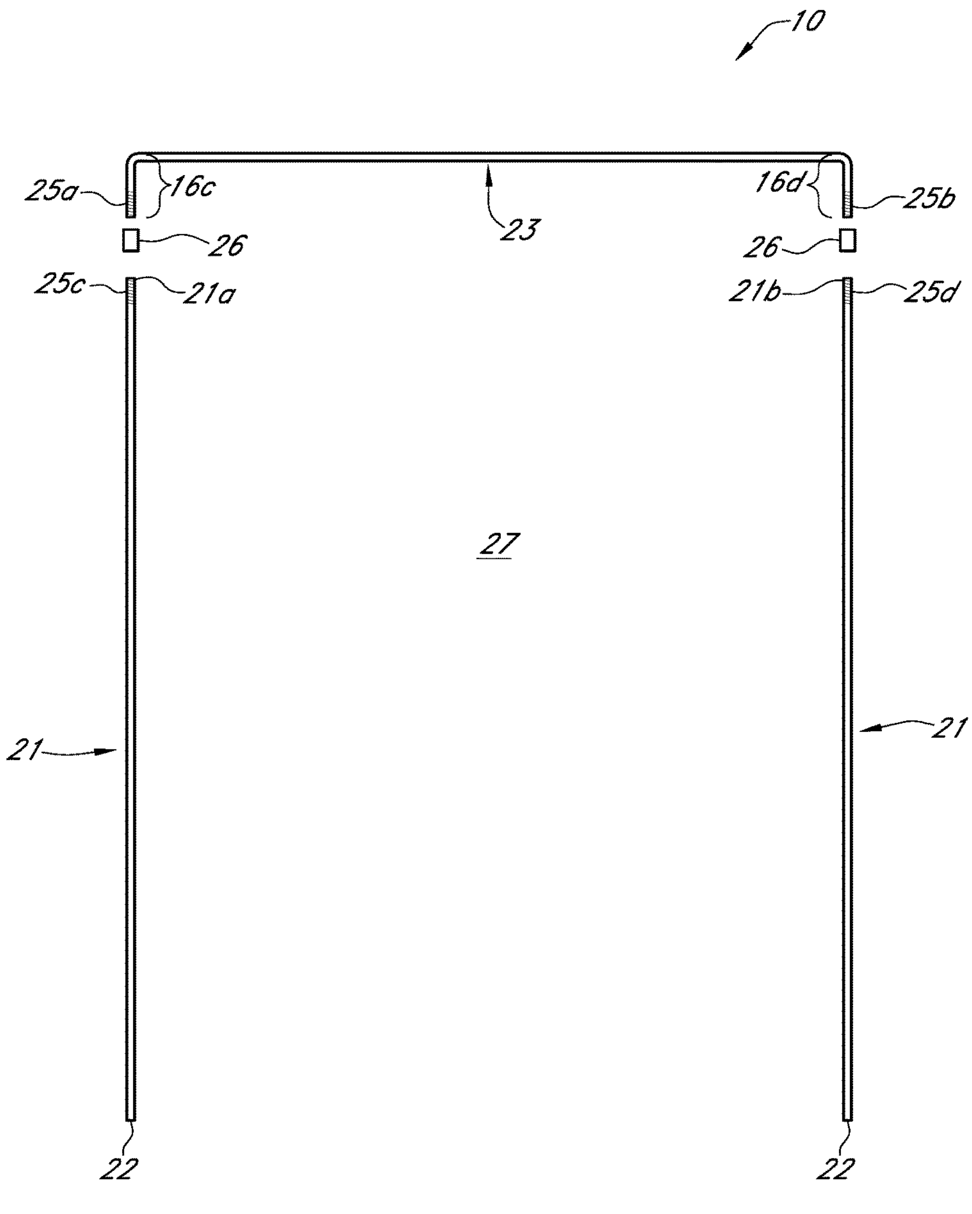
FIG. 4 is a front elevational view of a fourth embodiment of the sign holder described herein.

The embodiments disclosed at FIGS. 2-4 build upon and further improve upon the embodiment of FIG. 1. FIGS. 2 and 2A illustrate another embodiment of the present invention. As shown, the sign holder (10) comprises an upper portion (13) further comprising a pair of upper posts (16) having an upper end (15) and a lower end (16*b*) attached to upper transverse member (23*a*) and transition length (20) at upper and lower connections (30*a*, 30*b*), respectively. A lower portion (27) further comprises an upper transverse member (23*a*) which forms a pair of lower posts (14). Each of the lower posts (14) has an angled portion (18) and a serpentine area (17). The serpentine area (17), as shown in FIGS. 2 and 2A, is a curved portion formed by transverse member (23*a*) and transition length (20). A lobe is formed between the curved portion of the transverse member (23*a*) and the transition length (20) by the lower portion of the upper post length (16*b*). Each of the lower posts (14) has a lower portion (21) extending downwardly from the transverse member (23) and is selectively insertable into the ground at lower end (22). Each post of said pair of upper posts (16) has an upper portion (16*a*) for selectively receiving a sign for display at said upper end (15) of each said post (16). Additionally, the upper posts (16) have a lower portion (16*b*) affixed to the first (upper) transverse member (23*a*) and to the transition length (20), both fore and aft of the serpentine area (17) of post (14). Although in no way limiting, applicant believes spot welding is a suitable method of construction for affixing the upper portion (16*a*) to the transverse member (23*a*) and the transition length 20, at upper and lower connections (30*a*, 30*b*), respectively. Other methods of fabrication including casting may also be used. The sign holder (10) has a full length of eighteen inches (18"). The upper posts (16) are eight inches (8") long and the transverse member(s) (23, 23*a*) is/are eleven inches (11") long. The lower portion (16*b*) affixed to and between the first (upper) transverse member (23*a*) and the transition length (20) is one and a half inches long (1.5"). Although any material may be chosen for construction, applicant believes 4.115 mm diameter galvanized steel is suitable for many applications for the lower post (14) and 3.75 mm diameter galvanized steel is sufficient for the upper post (16).

FIG. 3 illustrates another embodiment of the present invention wherein the embodiment of FIG. 2 has a second transverse member (23) affixed between the lower portion of the posts (14) below the first transverse member (23*a*). The embodiment of FIG. 3 allows for an increased height, as compared to the embodiment of FIG. 2, of the sign holder (10) incorporating the benefits of the strength and rigidity of the present invention. The embodiment disclosed in FIG. 3 has a total height of thirty inches (30") versus the total height of the embodiment disclosed at FIG. 2 of eighteen inches (18"). As one of ordinary skill will appreciate, the foregoing dimensions are by way of illustration only and do not limit the disclosure.

FIG. 4 illustrates another embodiment of the present invention. A sign holder (10) for displaying a sign above a ground surface (11) comprises an upper transverse member portion (23) for selectively receiving a sign (12) for display. The upper transverse member portion (23) further comprises a pair of upper posts (16) having a first and second end (16*c*, 16*d*) with male threads (25*a*, 25*b*). A lower portion selectively insertable into the ground surface (11) also has a pair of posts (21) having a first and second end (21*a*, 21*b*) with first and second threaded ends (25*c*, 25*d*). A pair of threaded couplings (26) affixes the first and second ends of the upper transverse member portion (23) to the first and second ends of the lower portion (21). Although in no way limiting, the posts (21) of the lower portion (27) are typically twenty eight inches (28") in length. The upper transverse member (23) is twenty-four inches (24") in length and post ends (16*c*, 16*d*) are typically two inches (2") in length. Although any material may be chosen for construction, applicant believes 3.75 mm galvanized steel is suitable for many applications. The posts (21) of the lower portion (27) are typically twenty eight inches (28") in length. The industrial applicability of the sign holder (10) is believed to be apparent from the foregoing description.

Although only exemplary embodiments of the invention have been described in detail above, those skilled in the art will readily appreciate that many modifications are possible without materially departing from the novel teachings and advantages of this invention. Accordingly, all such modifications are intended to be included within the scope of this invention as defined in the following claims.

The invention claimed is:

1. A method for displaying a bag sign above a ground surface comprising:

a) Assembling a bag sign holder, the bag sign holder further comprising:

i) an upper portion formed by an upper transverse member (23) having a pair of upper posts (16) positioned at a first end (16*c*) and a second end (16*d*), wherein the pair of upper posts (16) are perpendicular to the upper transverse member (23) and generally parallel to each other, wherein the first end is configured with male threads (25*a*) and the second end is configured with male threads (25*b*);

ii) a lower portion formed by a first lower post (21) having a first end (21*a*) configured with male threads (25*c*) and a second end (22) for engagement with a ground surface and a second lower post (21) also having a first end (21*b*) configured with male threads (25*d*) and a second end (22) for engagement with a ground surface;

iii) a pair of threaded couplings (26), the threaded couplings (26) when connected affixing the first end of each of the first lower post (21*a*) and the second lower post (21*b*) to the upper posts (16) at the first end (16*c*) and the second end (16*d*);

b) Positioning a bag sign for engagement with the bag sign holder proximate the upper transverse member (23) wherein the bag sign is configured as an envelope defined by four sides further comprising:

i) a first side, ii) a second side, the second side opposite the first side;

iii) a third side, the third side connecting the first and the second sides and positioned at the top of the bag sign;

iv) a fourth side, the fourth side connecting the first and the second sides and positioned at the bottom of the bag sign, wherein the first, the second and the third sides are sealed and the fourth side is open, wherein the upper transverse member (23) is positioned in the open fourth side and the bag sign is slide down onto the bag sign holder to enclose the pair of threaded couplings (26); and, c) Engaging the second end (22) of each of the lower posts (21) for engagement with a ground surface.

2. A sign holder for displaying a sign above a ground surface comprising:

a) An upper portion, the upper portion comprising a pair of upper post lengths having an upper end and a lower end, wherein each post of the pair of posts terminates at the upper end, wherein the upper portion is configured to selectively receive a sign for vertical display, wherein each post of the pair of upper post lengths terminates at the lower end; and, b) A lower portion further comprising:

i) A pair of serpentine areas formed at both ends of a transverse member positioned at the lower end of each of the upper posts, each of the serpentine areas defined by a first bend, a transition length, and a second bend, wherein the transition length extends between and connects the first bend and the second bend, wherein a lobe is formed within each the serpentine areas by an upper connection between the lower portion of the upper post length and the transverse member and a lower connection between the transition length and the lower portion of the upper post length;

ii) A pair of posts, each post connected to and extending down from each of the second bends via a lower length, the lower length extending from the second bend to terminate at a lower end, the lower end selectively insertable into the ground iii) A sign holder for displaying a sign above a ground surface according to claim 1 wherein each post is formed from stainless steel having a diameter of at least 0.162 inches.

3. The sign holder of claim 2 wherein a second transverse member is attached to and between the pair of posts of the lower portion and positioned below the first transverse member and above the lower ends of the pair of posts.

4. The sign holder of claim 3 wherein either the first or the second transverse member is formed having a diameter greater than that of each the posts.

5. The sign holder of claim 2 wherein the upper portion is configured to selectively receive a corrugated sign for display, wherein the corrugated sign has a plurality of corrugations therein suitable for slidable engagement between the upper portion of the upper post lengths and the transverse member.

6. The sign holder of claim 2 wherein the lower portion further comprises a lower portion having a second pair of serpentine areas formed at both ends of a third transverse member, the third transverse member positioned below the first transverse member and above the second transverse member.

7. The sign holder of claim 6 wherein the upper portion is configured to selectively receive a corrugated sign for display, wherein said corrugated sign has a plurality of corrugations therein suitable for slidable engagement between the upper portion of the upper post lengths and the first transverse member.

8. A sign holder for displaying a corrugated sign above a ground surface comprising:

a) a pair of symmetrical posts, each post of the pair of posts further comprising:

i) An upper portion, the upper portion having an upper end and a lower end, wherein the post terminates at the upper end, wherein the upper portion is configured to selectively receive a corrugated sign for display, wherein the corrugated sign has a plurality of corrugations therein suitable for slidable engagement between the upper end and the lower end of each post;

ii) A serpentine area formed at the lower end of the post by a first bend, a second bend, and a transition length extending between the first bend and the second bend, wherein the first bend and the second bend form a complimentary angle;

iii) A lower length extending from the second bend to terminate at a lower end, the lower end selectively insertable into the ground;

b) a transverse member affixed between the pair of posts, the transverse member positioned below the serpentine area and above the lower end of the pair of posts; and, c) wherein the transverse member is integral with the pair of symmetrical posts and non-removable thereby fixing the position of both the upper portion and the lower portion of the sign holder.

9. The sign holder for displaying a corrugated sign above a ground surface according to claim 8 wherein a second transverse member is affixed between the pair of posts and is positioned below the first transverse member, wherein the pair of posts have a lower end extending beyond the second transverse member, the lower end selectively insertable into the ground.

10. The sign holder for displaying a corrugated sign above a ground surface according to claim 8 wherein the upper portion of each of the posts and the transition length form a 120° interior angle.

11. The sign holder for displaying a corrugated sign above a ground surface according to claim 8 wherein the lower portion of each of the posts and the transition length form a 120° exterior angle.

12. The sign holder for displaying a corrugated sign above a ground surface according to claim 8 wherein each post is formed from stainless steel having a diameter of at least 0.162 inches.

13. The sign holder for displaying a corrugated sign above a ground surface according to claim 8 wherein the transverse member is formed from stainless steel having a diameter greater than that of the posts.

14. The sign holder for displaying a corrugated sign above a ground surface of claim 8 wherein the transverse member has a diameter of at least 0.188 inches.

15. The sign holder for displaying a corrugated sign above a ground surface according to claim 8 wherein the upper and lower portions have substantially the same length dimension.

16. The sign holder for displaying a corrugated sign above a ground surface according to claim 10 wherein the lower portions of the posts have a separation dimension substantially the same as the upper and lower portions length dimension.

17. The sign holder for displaying a corrugated sign above a ground surface according to claim 16 wherein the upper portions of the posts have a second separation dimension greater than the lower portions separation dimension.

* * * * *